(12) United States Patent
Baba et al.

(10) Patent No.: US 10,666,165 B2
(45) Date of Patent: May 26, 2020

(54) POWER CONVERTING APPARATUS, POWER MANAGEMENT SYSTEM, AND POWER CONVERTING METHOD

(71) Applicant: KYOCERA Corporation, Kyoto-shi, Kyoto (JP)

(72) Inventors: Masahiro Baba, Kawasaki (JP); Tetsuya Takenaka, Yamato (JP); Yuki Suzuki, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 303 days.

(21) Appl. No.: 15/553,340

(22) PCT Filed: Feb. 25, 2016

(86) PCT No.: PCT/JP2016/055569
§ 371 (c)(1),
(2) Date: Aug. 24, 2017

(87) PCT Pub. No.: WO2016/136860
PCT Pub. Date: Sep. 1, 2016

(65) Prior Publication Data
US 2018/0138829 A1 May 17, 2018

(30) Foreign Application Priority Data

Feb. 25, 2015 (JP) .................. 2015-035086
Feb. 25, 2015 (JP) .................. 2015-035911

(51) Int. Cl.
*H02M 11/00* (2006.01)
*H02J 7/00* (2006.01)
(Continued)

(52) U.S. Cl.
CPC .............. *H02M 11/00* (2013.01); *G05F 1/67* (2013.01); *H02J 3/32* (2013.01); *H02J 3/38* (2013.01); *H02J 3/383* (2013.01); *H02J 7/0071* (2020.01); *H02J 7/35* (2013.01); *H02M 7/48* (2013.01); *F03D 7/0284* (2013.01); *H02J 3/003* (2020.01); *H02J 2207/20* (2020.01); *H02M 2001/0016* (2013.01); *Y02E 10/58* (2013.01)

(58) Field of Classification Search
CPC ............. H02M 11/00; H02J 7/35; H02J 3/383
USPC ........................................... 320/101
See application file for complete search history.

(56) References Cited

U.S. PATENT DOCUMENTS

2011/0215577 A1  9/2011  Martin Da Silva et al.
2014/0152105 A1  6/2014  Yasugi et al.

FOREIGN PATENT DOCUMENTS

| JP | 2012-139019 A | | 7/2012 |
| JP | 2012139019 | * | 7/2012 |
| JP | 2014-171359 A | | 9/2014 |

OTHER PUBLICATIONS

International Search Report dated May 10, 2016, issued by Japan Patent Office for International Application No. PCT/JP2016/055569.

* cited by examiner

*Primary Examiner* — Richard V Muralidar
(74) *Attorney, Agent, or Firm* — Procopio Cory Hargreaves and Savitch LLP (57) ABSTRACT

A PCS performs a control of increasing an output of a solar cell to exceed the suppression power threshold, when there is a period, where the output of the solar cell falls below a suppression power threshold, in an accumulation period included in a suppression period in which the output of the solar cell is suppressed.

18 Claims, 9 Drawing Sheets

(51) Int. Cl.
*G05F 1/67* (2006.01)
*H02M 1/00* (2006.01)
*H02M 7/48* (2007.01)
*H02J 3/38* (2006.01)
*H02J 3/32* (2006.01)
*H02J 7/35* (2006.01)
*F03D 7/02* (2006.01)
*H02J 3/00* (2006.01)

POWER CONVERTING APPARATUS, POWER MANAGEMENT SYSTEM, AND POWER CONVERTING METHOD

TECHNICAL FIELD

The present invention relates to a power converting apparatus that converts a DC power to an AC power, a power management system including the power converting apparatus, and a power converting method.

BACKGROUND ART

A power converting apparatus (power conditioner) connected to a distributed power source that outputs a DC power is known. The power converting apparatus includes a DC convertor (DC/DC convertor) that converts a voltage of a DC power input from the distributed power source; and an inverter that converts the DC power input from the DC convertor to an AC power (for example, Patent Document 1).

Here, upon reception of a message instructing suppression of output of the distributed power source (hereinafter, "output suppression message"), the power converting apparatus needs to suppress the output of the distributed power source to equal to or less than a suppression power threshold defined by the output suppression message.

PRIOR ART DOCUMENT

Patent Document

Patent Document 1; Japanese Application Publication No. 2014-171359

SUMMARY OF THE INVENTION

According to one aspect, a power converting apparatus comprises an inverter that converts a DC (Direct Current) power input from a distributed power source to an AC (Alternating Current) power; and a controller that suppresses an output of the distributed power source to equal to or lower than a suppression power threshold indicating a suppression degree for the output of the distributed power source. The controller performs a control of increasing the output of the distributed power source to exceed the suppression power threshold, when there is a period, where the output of the distributed power source falls below the suppression power threshold, in an accumulation period included in a suppression period in which the output of the distributed power source is suppressed.

According to one aspect, a power management system comprises a power converting apparatus that converts a DC power input from a distributed power source to an AC power; and a controller that suppresses an output of the distributed power source equal to or lower than a suppression power threshold indicating a suppression degree for the output of the distributed power source. The controller performs a control of increasing the output of the distributed power source to exceed the suppression power threshold, when there is a period, where the output of the distributed power source falls below the suppression power threshold, in an accumulation period included in a suspension period for suppressing the output of the distributed power source.

According to one aspect, a power converting apparatus comprises an inverter that converts a DC power input from a distributed power source to an AC power, converts a DC power input from a storage battery to an AC power, and converts a AC power to a DC power output to the storage battery; and a controller that suppresses an output of the distributed power source equal to or lower than a suppression power threshold indicating a suppression degree for the output of the distributed power source. The controller performs a control of increasing the output of the distributed power source to exceed the suppression power threshold, in an accumulation period included in a suppression period in which the output of the distributed power source is suppressed, when the storage battery is charged with the output of the distributed power source.

According to one aspect, a power management system comprises a power converting apparatus that converts a DC power input from a distributed power source to an AC power, converts a DC power input from a storage battery to an AC power, and converts a AC power to a DC power output to the storage battery; and a controller that suppresses an output of the distributed power source equal to or lower than a suppression power threshold indicating a suppression degree for the output of the distributed power source. The controller performs a control of increasing the output of the distributed power source to exceed the suppression power threshold, in an accumulation period included in a suppression period in which the output of the distributed power source is suppressed, when the storage battery is charged with the output of the distributed power source.

According to one aspect, a power converting method, comprising the steps of converting a DC power input from a distributed power source to an AC power, converting a DC power input from a storage battery to an AC power, and converting a AC power to a DC power output to the storage battery; suppressing an output of the distributed power source to equal to or lower than a suppression power threshold indicating a suppression degree for the output of the distributed power source; and performing a control of increasing the output of the distributed power source so that the output of the distributed power source exceeds the suppression power threshold, in an accumulation period included in a suppression period in which the output of the distributed power source is suppressed, when the storage battery is charged with the output of the distributed power source.

DESCRIPTION OF THE EMBODIMENT

An embodiment is described below by referring to the drawings. In the following description of the drawings, same or similar reference numerals are given to denote same or similar portions.

Note that the drawings are merely schematically shown and proportions of sizes and the like are different from actual ones. Thus, specific sizes and the like should be judged by referring to the description below. In addition, there are of course included portions where relationships or ratios of sizes of the drawings are different with respect to one another.

Overview of Embodiment

In the above-described conventional technology, after the output suppression message is received, the output of the distributed power source may be inevitably smaller than the suppression power threshold due to a predetermined factor. For example, when the distributed power source is a solar cell apparatus, the predetermined factor may include an insufficient solar radiation. Alternatively, when the distributed power source is a wind energy conversion system, the predetermined factor may include an insufficient amount of winds. Such a situation is greatly disadvantageous to a user.

In embodiment, a power converting apparatus comprises an inverter that converts a DC (Direct Current) power input from a distributed power source to an AC (Alternating Current) power; and a controller that suppresses an output of the distributed power source to equal to or lower than a suppression power threshold indicating a suppression degree for the output of the distributed power source. The controller performs a control of increasing the output of the distributed power source to exceed the suppression power threshold, when there is a period, where the output of the distributed power source falls below the suppression power threshold, in an accumulation period included in a suppression period in which the output of the distributed power source is suppressed.

In the embodiment, the controller performs a control of increasing the output of the distributed power source to exceed the suppression power threshold, when there is, in an accumulation period, a period where the output of the distributed power source falls below the suppression power threshold value. Therefore, even when there occurs a situation where the output of the distributed power source is inevitably smaller than the suppression power threshold value due to a predetermined factor such as an insufficient solar radiation, the output of the distributed power source may be increased to exceed the suppression power threshold value to alleviate a disadvantage of a user.

Embodiment

Figure 1:
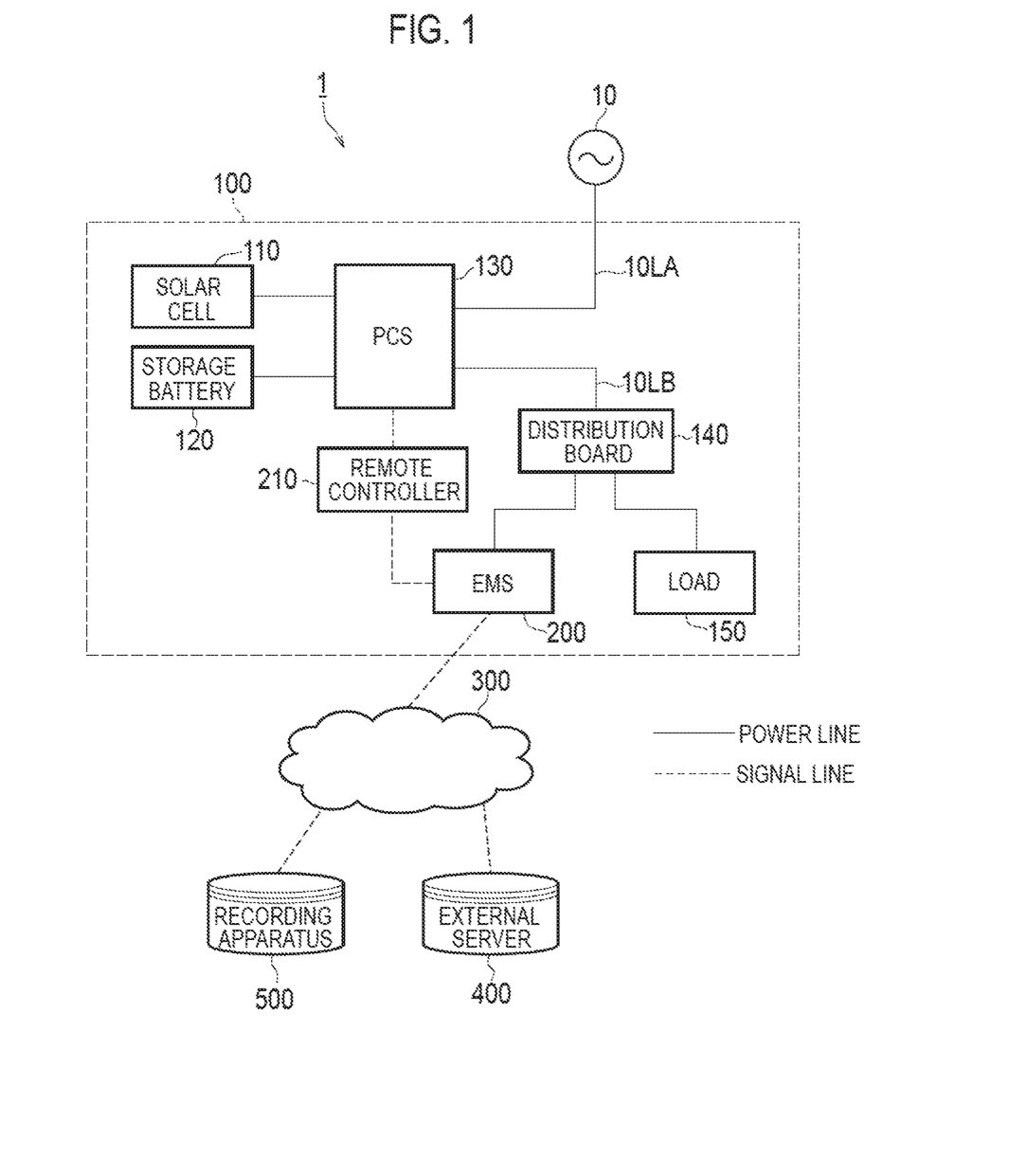
FIG. 1 is a diagram illustrating a power management system 1 according to an embodiment.

A power management system according to an embodiment will be described, below. FIG. 1 is a diagram illustrating the power management system 1 according to the embodiment.

As illustrated in FIG. 1, the power management system 1 includes a consumer's facility 100, an external server 400, and a recording apparatus 500. The consumer's facility 100 has an EMS 200, and the EMS 200 communicates with the external server 400 and the recording apparatus 500 via a network 300.

The consumer's facility 100 includes a solar cell 110, a storage battery 120, a PCS 130, a distribution board 140, and a load 150. Furthermore, the consumer's facility 100 includes the EMS 200 and a remote controller 210.

The solar cell 110 is an equipment that generates power in response to reception of solar light. The solar cell 110 outputs the generated DC power. An amount of power to be generated by the solar cell 110 varies depending on an amount of the solar radiation entering the solar cell 110. The solar cell 110 is an example of a distributed power source to operate in accordance with an output suppression message described later.

The storage battery 120 is an equipment in which power is accumulated. The storage battery 120 outputs the accumulated DC power. It should be noted that in the embodiment, the storage battery 120 needs not to operate in accordance with the output suppression message described later.

The PCS 130 (PCS: Power Conditioning System) is an example of a power converting apparatus that converts a DC power to an AC power. In the embodiment, the PCS 130 is connected to a main power line 10L (herein, a main power line 10LA and a main power line 10LB) connected to a power grid 10, and connected to both the solar cell 110 and the storage battery 120. The main power line 10LA is a power line connecting the power grid 10 and the PCS 130, and the main power line 10LB is a power line connecting the PCS 130 and the distribution board 140.

Here, the PCS 130 converts the DC power input from the solar cell 110 to an AC power, and converts the DC power input from the storage battery 120 to an AC power. Furthermore, the PCS 130 converts an AC power supplied from the power grid 10 to a DC power.

The distribution board 140 is connected to the main power line 10L (herein, the main power line 10LB). The distribution board 140 divides the main power line 10LB into a plurality of power lines, and distributes the power to an equipment (herein, the load 150 and the EMS 200) connected to the plurality of power lines.

The load 150 is an equipment in which the power supplied via the power line is consumed. Examples of the load 150 include an equipment such as a refrigerator, a lighting, an air conditioner, and a TV. The load 150 may be a single equipment, and may include a plurality of equipments.

The EMS 200 is an equipment (EMS: Energy Management System) that manages power information indicating the power supplied to the consumer's facility 100 from the power grid 10. The EMS 200 may manage an amount of power to be generated by the solar cell 110, an amount of power to be stored in the storage battery 120, and an amount of power to be discharged from the storage battery 120.

In the embodiment, the EMS 200 is connected to the remote controller 210 and the network 300. For example, the EMS 200 receives the power suppression message described later from the external server 400, and notifies the remote controller 210 of the power suppression message. Alternatively, the EMS 200 receives a schedule (calendar) described later from the external server 400, and based on the schedule (calendar), notifies the remote controller 210 of the power suppression message.

The PCS 130 has the remote controller 210 provided in connection with the PCS 130, and the remote controller 210 notifies the PCS 130 of various types of messages to operate the PCS 130. For example, the remote controller 210 notifies the PCS 130 of the power suppression message received from the EMS 200.

The network 300 is a communication network by which the EMS 200, the external server 400, and the recording apparatus 500 are connected. The network 300 may be the Internet. The network 300 may include a mobile communication network.

The external server 400 notifies the output suppression message that is a message to instruct suppression of the output of the distributed power source (herein, the solar cell 110). Here, the external server 400 may manage a schedule (calendar), as a whole of the power grid 10, including a date and time for suppressing the output of the distributed power source. The external server 400 notifies the output suppression message, based on such a schedule (calendar). Alternatively, the external server 400 may notify the EMS 200 of such a schedule (calendar).

Here, the output suppression message and the schedule (calendar) include information indicating a suppression degree (an output suppression power threshold, for example) for the output of the distributed power source (herein, the solar cell 110). The suppression degree may be represented by an absolute value (xx kW, for example) of the output of the distributed power source (herein, the solar cell 110). Alternatively, the suppression degree may be represented by a relative value (decrease by xx kW, for example) of the output of the distributed power source (herein, the solar cell 110). Alternatively, the suppression degree may be represented by a suppression rate (xx %, for example) of the output of the distributed power source (herein, the solar cell 110). The suppression rate preferably is a rate of the distributed power source relative to the output certified, as an output capability of the PCS that controls the distributed power source (hereinafter, facility certified output), when the distributed power source is installed in the consumer's facility 100. If the output capability of the distributed power source and that of the PCS differ, either one of a smaller output capability is selected, as the facility certified output. When a plurality of PCSs are installed, the facility certified output is a sum of the output capabilities of the plurality of PCSs.

The recording apparatus 500 is an equipment that records various types of information. Specifically, the recording apparatus 500 records a verification record to verify whether or not the suppression of the output of the distributed power source is correctly executed according to the output suppression message. The verification record is an accumulated value of outputs of the distributed power source in an accumulation period (30 minutes, for example) included in the suppression period in which the output of the distributed power source is suppressed by the output suppression message. In such a case, in the verification record accumulated for each accumulation period, the suppression of the output of the distributed power source may be correctly executed.

(Power Converting Apparatus)

Figure 2:
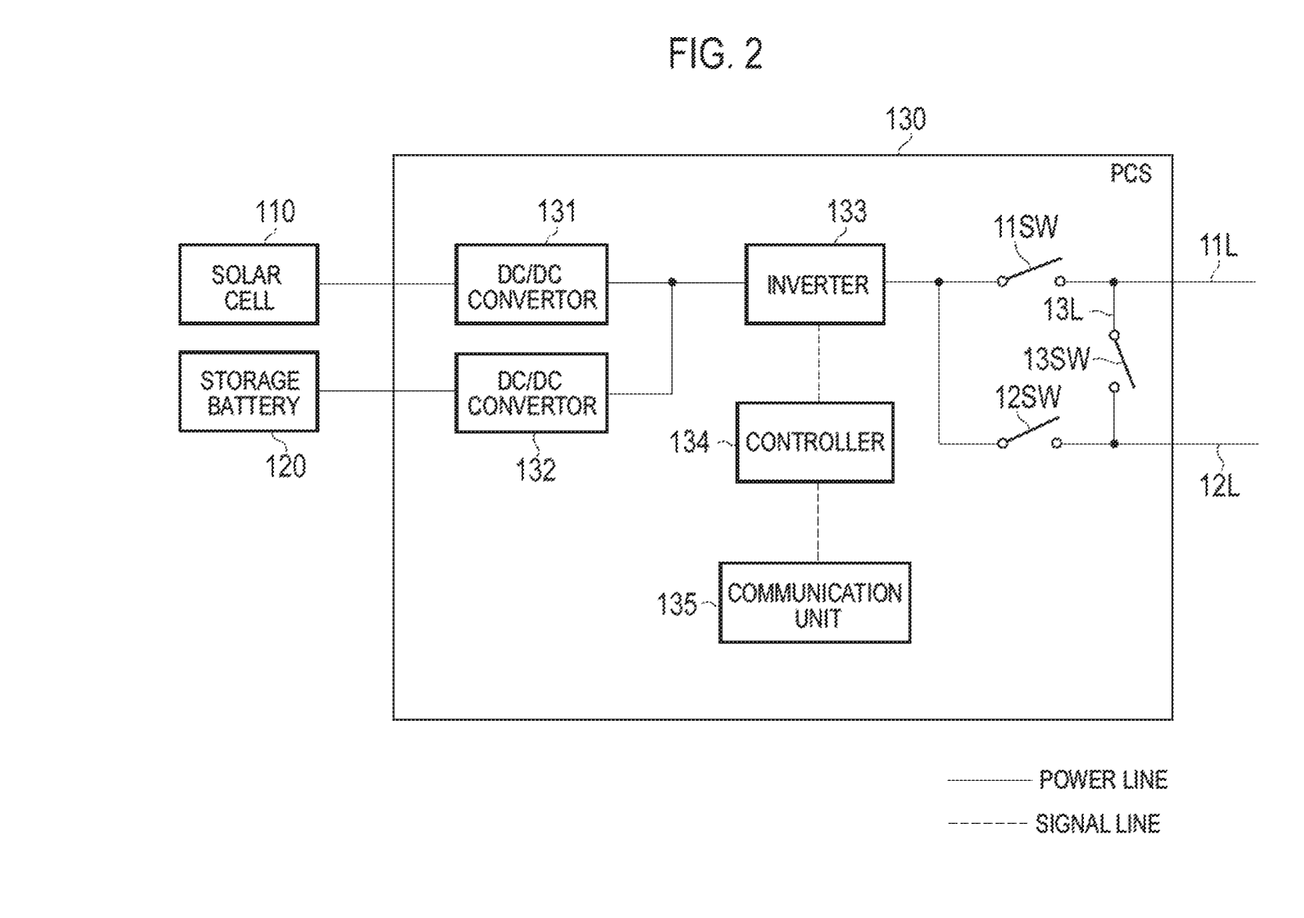
FIG. 2 is a diagram illustrating a PCS 130 according to the embodiment.

The power converting apparatus according to the embodiment will be described below. FIG. 2 is a diagram illustrating the PCS 130 according to the embodiment.

As illustrated in FIG. 2, the PCS 130 is connected to a power line 11L connected to the main power line 10LA, and a power line 12L connected to the main power line 10LB. Furthermore, a power line 13L connecting the power line 11L and the power line 12L is provided. The power line 13L is connected closer to the power line 11L at the main power line 10LA side than a switch 11SW, and connected closer to the power line 12L at the main power line 10LB than a switch 12SW.

The power line 11L is a power line connecting the power grid 10 and an inverter 133. The power line 11L may be a power line configuring a part of the main power line 10LA, and may be a power line divided from the main power line 10LA. The power line 12L is a power line connecting the inverter 133 and the distribution board 140 (load 150). The power line 12L may be a power line configuring a part of the main power line 10LB, and may be a power line divided from the main power line 10LB.

The PCS 130 includes the switch 11SW provided on the power line 114 the switch 12SW provided on the power line 12L, and a switch 13SW provided on the power line 13L.

The switch 11SW is controlled to be in a closed state in a grid connected state in which the PCS 130 is connected to the power grid 10. On the other hand, the switch 11SW is controlled to be in an opened state in a self-sustained state in which the PCS 130 parallels off the power grid 10.

The switch 12SW is controlled to be in an opened state in a grid connected state in which the PCS 130 is connected to the power grid 10. On the other hand, the switch 12SW is controlled to be in a closed state in a self-sustained state in which the PCS 130 is disconnected from the power grid 10.

The switch 13SW is controlled to be in a closed state in a grid connected state in which the distribution board 140 (load 150) is connected to the power grid 10. Likewise, the switch 13SW is controlled to be in a closed state in a grid connected state in which the PCS 130 is connected to the power grid 10. On the other hand, the switch 13SW is controlled to be in an opened state in a self-sustained state in which the distribution board 140 (load 150) is disconnected from the power grid 10. Likewise, the switch 13SW is controlled to be in an opened state in a self-sustained state in which the PCS 130 is disconnected from the power grid 10.

Generally, in the grid connected state in which the consumer's facility 100 is connected to the power grid 10, both the PCS 130 and the distribution board 140 (load 150) are connected to the power grid 10. Therefore, in such a grid connected state, the switch 11SW and the switch 13SW are controlled to be in a closed state, and the switch 12SW is controlled to be in an opened state. On the other hand, generally, in the self-sustained state in which the consumer's facility 100 is disconnected from the power grid 10, both the PCS 130 and the distribution board 140 (load 150) are not connected to the power grid 10. Therefore, in such a self-sustained state, the switch 11SW and the switch 13SW are controlled to be in an opened state, and the switch 12SW is controlled to be in a closed state.

As illustrated in FIG. 2, the PCS 130 includes a DC/DC convertor 131, a DC/DC convertor 132, the inverter 133, a controller 134, and a communication unit 135.

The DC/DC convertor 131 is a first direct current convertor that converts a voltage of a DC power input from the solar cell 110. The DC/DC convertor 131 may upconvert the voltage of the DC power and downconvert the voltage of the DC power.

The DC/DC convertor 132 is a second direct current convertor that converts a voltage of a DC power input from the storage battery 120. Furthermore, the DC/DC convertor 132 converts a voltage of the DC power input from the inverter 133. The DC/DC convertor 132 may upconvert the voltage of the DC power and may downconvert the voltage of the DC power.

It should be noted here that an operation of outputting the DC power from the storage battery 120 to the DC/DC convertor 132 is discharge from the storage battery 120. It should be noted that an operation of outputting the DC power from the DC/DC convertor 132 to the storage battery 120 is charge into the storage battery 120.

The inverter 133 converts the DC power input from the DC/DC convertor 131 and the DC power input from the DC/DC convertor 132, to an AC power. Furthermore, the inverter 133 converts the AC power supplied from the power grid 10 to a DC power.

The controller 134 controls the PCS 130. Firstly, the controller 134 controls an amount of power generated by the solar cell 110. In particular, the controller 134 controls the output of the solar cell 110 to approach a target power (MPPT Maximum Power Point Tracking), for example). As a result, an operation point (point determined by an operation-point voltage value and power value, or a point determined by an operation-point voltage value and electric current value) of the solar cell 110 is optimized. Secondly, the controller 134 controls the charge amount and the discharge amount in the storage battery 120.

Here, the controller 134 suppresses the output of the solar cell 110 according to the output suppression message or the schedule (calendar). As described above, the suppression degree may be represented by an absolute value (xx kW, for example) of the output of the solar cell 110. Alternatively, the suppression degree may be represented by a relative value (decrease by xx kW, for example) of the output of the solar cell 110. Alternatively, the suppression degree may be represented with a suppression rate (xx %, for example) of the output of the solar cell 110.

In the embodiment, if there is a period during which the output of the solar cell 110 falls below the suppression power threshold (hereinafter, insufficient output period), in the accumulation period included in the suppression period in which the output of the solar cell 110 is suppressed, the controller 134 performs a control of increasing the output of the solar cell 110 to exceed the suppression power threshold. That is, in the control, in order to compensate the output of the solar cell 110 decreasing than the suppression power threshold in an insufficient output period, the controller 134 temporarily increases the output of the solar cell 110. The suppression period is defined, based on the output suppression message or the schedule (calendar).

Here, the insufficient output period is a period during which the output of the solar cell 110 is inevitably smaller than the suppression power threshold due to a predetermined factor. The predetermined factor is an insufficient solar radiation, for example.

In the embodiment, the controller 134 performs a control of ensuring the accumulated value of the outputs of the solar cell 110 not to exceed, in the accumulation period, the accumulated value of the suppression power thresholds. In other words, the controller 134 controls so that an average value of the outputs of the solar cell 110 does not exceed, in the accumulation period, an average value of the suppression power thresholds. It should be noted that as a result, in the verification record accumulated for each accumulation period, the suppression of the output of the solar cell 110 is correctly executed.

Here, as described above, the controller 134 controls the output of the solar cell 110 so as to approach a target power (MPPT method). It should be noted that the controller 134 sets the suppression power threshold to the target power, in the suppression period, and sets a maximum power outside the suppression period to the target power. However, it should be noted that when performing the control even in the suppression period, the controller 134 sets a value higher than the suppression power threshold to the target power.

The controller 134 outputs a verification record to verify whether or not the suppression of the output of the solar cell 110 is correctly executed according to the output suppression message. As described above, the verification record is an accumulated value of outputs of the solar cell 110 in the accumulation period (30 minutes, for example) included in the suppression period. The controller 134 accumulates the accumulated value of the output power of the solar cell 110 for each accumulation period (30 minutes, for example), and outputs the accumulated value accumulated for each accumulation period as the verification record.

The communication unit 135 communicates with the remote controller 210. For example, the communication unit 135 receives the output suppression message notified from the external server 400. The communication unit 135 transmits to the recording apparatus 500 the verification record output from the controller 134.

(One Example of Control)

Figure 3:
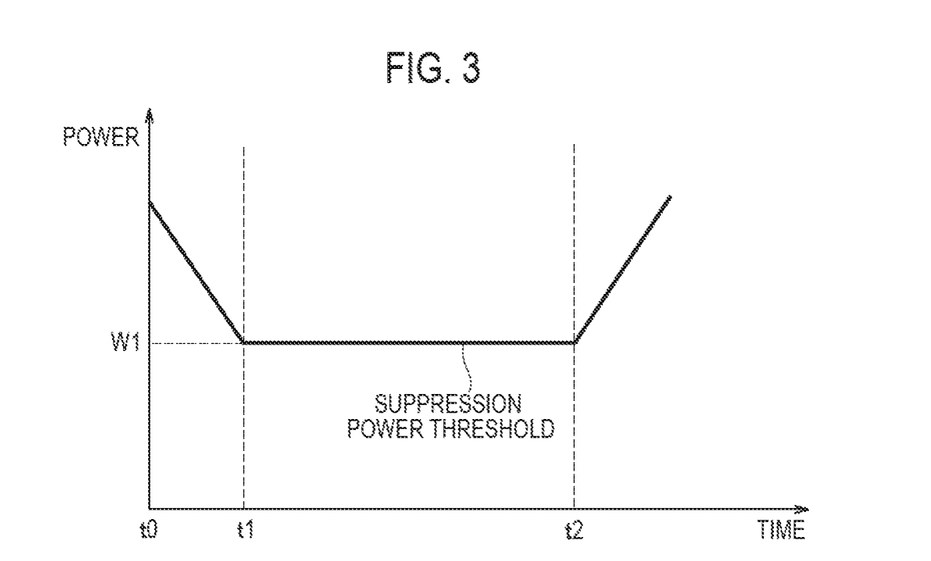
FIG. 3 is a graph for describing a control according to the embodiment.
Figure 4:
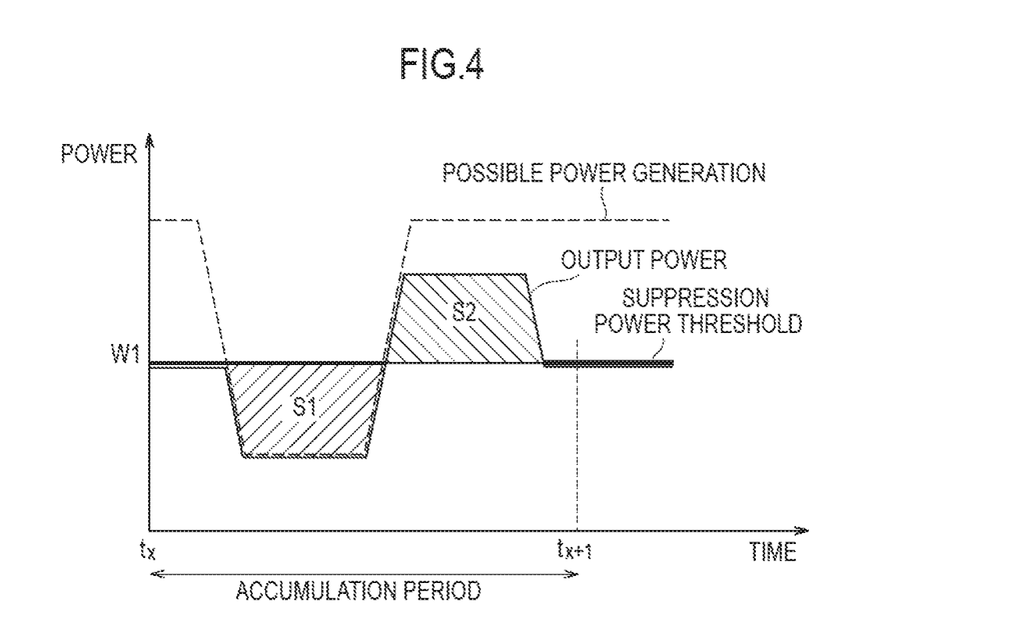
FIG. 4 is a graph for describing a control signal according to the embodiment.

An example of control according to the embodiment will be described below. FIG. 3 and FIG. 4 are diagrams for describing an example of the control according to the embodiment.

Firstly, the suppression power threshold will be described with reference to FIG. 3. FIG. 3 illustrates a case where the output suppression message is notified at a time t0 and an output suppression release message is notified at a time t2. The output suppression release message is a message instructing a suppression release of the output of the solar cell 110. Here, the output suppression message is a message instructing suppression of the output of the solar cell 110 to W1 or less.

In such a case, in a period from the time t0 to the time t1, the suppression power threshold decreases gradually at a previously determined decrease rate. The output suppression message is transmitted simultaneously to a plurality of PCSs, and thus, the decrease rate is previously determined to suppress a rapid decrease of an amount of reverse power flow to the power grid 10. On the other hand, after the time t2, the suppression power threshold increases gradually at a previously determined increase rate. The output suppression release message is transmitted simultaneously to a plurality of PCSs, and thus, the increase rate is previously determined to suppress a rapid increase of an amount of reverse power flow to the power grid 10.

Secondly, the control will be described with reference to FIG. 4. In FIG. 4, in the accumulation period from a time $t_x$ to a time $t_{x+1}$, there is a period (insufficient output period) during which the output of the solar cell 110 (possible power generation) falls below the suppression power threshold. The output of the solar cell 110 (possible power generation) decreases, for example, due to a temporal insufficient solar radiation, and outside the insufficient output period, exceeds the suppression power threshold.

In such a case, the PCS 130 performs a control of increasing the output of the solar cell 110 to exceed the suppression power threshold. It is noted that the accumulated value (area S2) of the output of the solar cell 110 exceeding the suppression power threshold does not exceed the accumulated value (area S1) of the output of the solar cell 110 falling below the suppression power threshold in the insufficient output period.

(Control Method)

Figure 5:
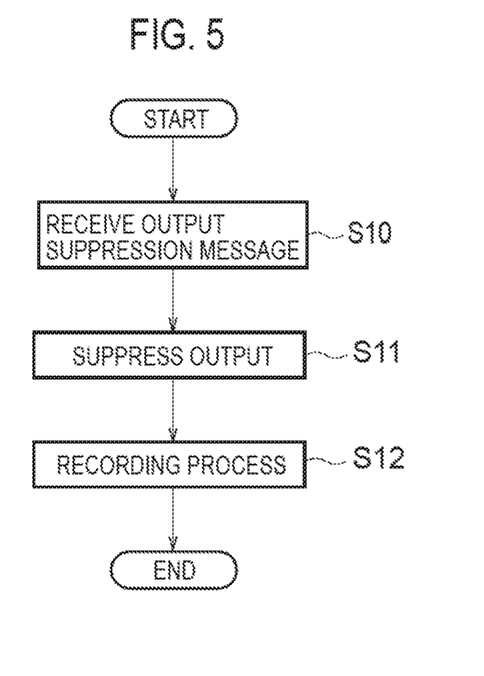
FIG. 5 is a flowchart illustrating a control method according to the embodiment.

A control method according to the embodiment will be described below. FIG. 5 is a flowchart illustrating the control method according to the embodiment.

As illustrated in FIG. 5, in step S10, the PCS 130 receives the output suppression message.

In step S11, the PCS 130 suppresses the output of the solar cell 110 according to the output suppression message. Here, when there is an insufficient output period in the accumulation period included in the suppression period, the PCS 130 performs a control of increasing the output of the solar cell 110 to exceed the suppression power threshold. The control is described in detail, as above.

In step S12, the PCS 130 accumulates the accumulated value of the output power of the solar cell 110 for each accumulation period (30 minutes, for example), and outputs the accumulated value accumulated for each accumulation period as the verification record. The verification record is recorded in the recording apparatus 500.

(Operation and Effect)

In the embodiment, the PCS 130 performs a control of increasing the output of the solar cell 110 to exceed the suppression power threshold, when there is, in the accumulation period, a period where the output of the solar cell 110 falls below the suppression power threshold. Therefore, even when there occurs a situation where the output of the solar cell 110 is inevitably smaller than the suppression power threshold due to a predetermined factor such as an insufficient solar radiation, the output of the solar cell 110 may be increased so as to exceed the suppression power threshold value to alleviate a disadvantage of a user.

Another Embodiment

Another embodiment will be described, below. A difference from the above-described embodiment will be described, below.

Overview of the Other Embodiment

In the above-described conventional technology, the output suppression message is a message for suppressing the reverse power flow to the power grid side, and thus, it may suffice that the reverse power flow to the power grid side is suppressed according to the output suppression message. Further, also known is a power converting apparatus that converts not only the DC power input from the above-described distributed power source but also a DC power input from a storage battery to an AC power.

Here, a case is assumed where in such a power converting apparatus, while suppressing the output of the distributed power source to equal to or less than the suppression power threshold determined by the output suppression message, the storage battery is charged with the output of the distributed power source. In such a case, when the reverse power flow to the power grid is concerned, a situation may occur where the output of the distributed power source is excessively suppressed in spite of the decrease of the output of the power converting apparatus due to the charging of the storage battery. Such a situation is greatly disadvantageous to a user.

The power converting apparatus according to another embodiment includes: an inverter that converts a DC power input from the distributed power source to an AC power, converts a DC power input from the storage battery to an AC power, and converts the AC power to a DC power output to the storage battery; and a controller that suppresses an output of the distributed power source to equal to or lower than a suppression power threshold indicating a suppression degree for the output of the distributed power source; in which the controller performs a control of increasing the output of the distributed power source to exceed the suppression power threshold, in an accumulation period included in a suppression period in which the output of the distributed power source is suppressed, when the storage battery is charged with the output of the distributed power source.

In the other embodiment, the controller performs a control of increasing the output of the distributed power source to exceed the suppression power threshold, when the storage battery is charged with the output of the distributed power source in the accumulation period. Therefore, when the reverse power flow to the power grid is concerned, a situation is prevented where the output of the distributed power source is excessively suppressed in spite of the decrease of the output of the power converting apparatus due to the charging of the storage battery, and thus, it is possible to alleviate the disadvantage to a user.

Details of the Other Embodiment

In another embodiment, when the storage battery 120 is charged with the output of the solar cell 110 in the accumulation period included in the suppression period in which the output of the solar cell 110 is suppressed, the controller 134 performs a control of increasing the output of the solar cell 110 to exceed the suppression power threshold. When the reverse power flow to the power grid 10 is concerned, the output of the PCS 130 is decreased due to the charging of the storage battery 120, and thus, the controller 134 temporarily increases the output of the solar cell 110 to alleviate the suppression of the output of the solar cell 110 with the charging of the storage battery 120. The suppression period is defined, based on the output suppression message or the schedule (calendar).

In the other embodiment, the controller 134 performs a control of ensuring, in the accumulation period, the accumulated value of the outputs of the solar cell 110 exceeding the suppression power threshold not to exceed the charge amount of the storage battery 120. It should be noted that as a result, when the reverse power flow to the power grid 10 is concerned, the suppression of the output of the solar cell 110 is correctly executed.

In the other embodiment, the controller 134 may perform the control before the storage battery 120 is charged. In such a case, the controller 134 performs the control on the basis of a storage capability of the storage battery 120. It should be noted however that the controller 134 performs the control of ensuring the accumulated value of the output of the solar cell 110 exceeding the suppression power threshold not to exceed the storage capability.

Alternatively, the controller 134 may perform the control after the storage battery 120 is charged. In such a case, the controller 134 performs the control on the basis of a currently stored amount of the storage battery 120. It should be noted however that the controller 134 performs the control of ensuring the accumulated value of the output of the solar cell 110 exceeding the suppression power threshold not to exceed the currently stored amount.

Here, as described above, the controller 134 controls the output of the solar cell 110 so as to approach a target power (MPPT method). It should be noted that the controller 134 sets the suppression power threshold to the target power, in the suppression period, and sets a maximum power outside the suppression period to the target power. However, it should be noted that when performing the control even in the suppression period, the controller 134 sets a value higher than the suppression power threshold to the target power.

The controller 134 outputs a verification record to verify whether or not the suppression of the output of the solar cell 110 is correctly executed according to the output suppression message. As described above, the verification record is the accumulated value of outputs of the PCS 130 (inverter 133) in the accumulation period (30 minutes, for example) included in the suppression period. The controller 134 accumulates the accumulated value of the output power of the PCS 130 (inverter 133) for each accumulation period (30 minutes, for example), and outputs the accumulated value accumulated for each accumulation period as the verification record.

The communication unit 135 communicates with the remote controller 210. For example, the communication unit 135 receives the output suppression message notified from the external server 400. The communication unit 135 transmits to the recording apparatus 500 the verification record output from the controller 134.

One Example of Control

Figure 6:
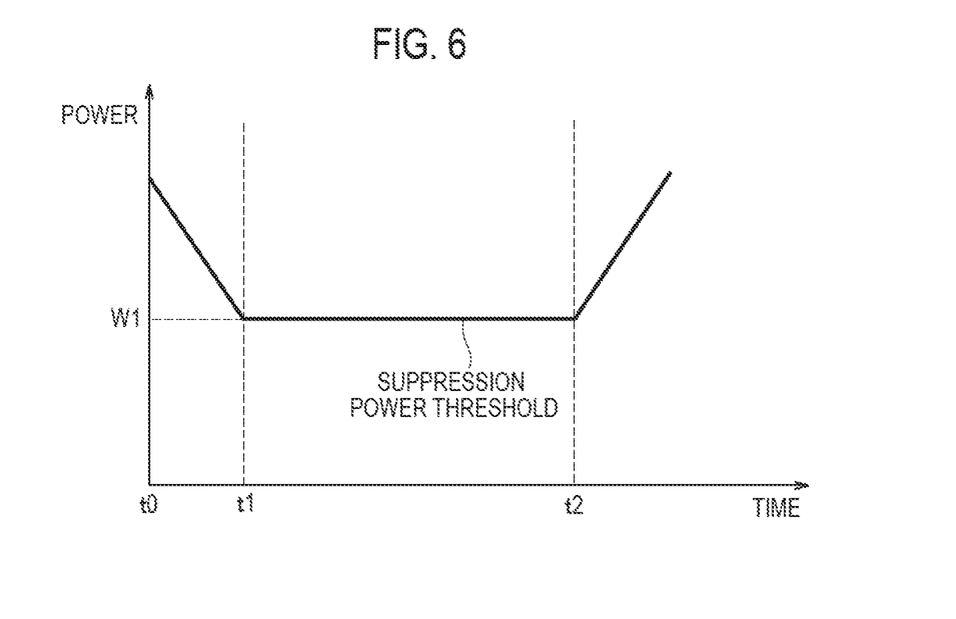
FIG. 6 is a graph for describing a control according to another embodiment.
Figure 7:
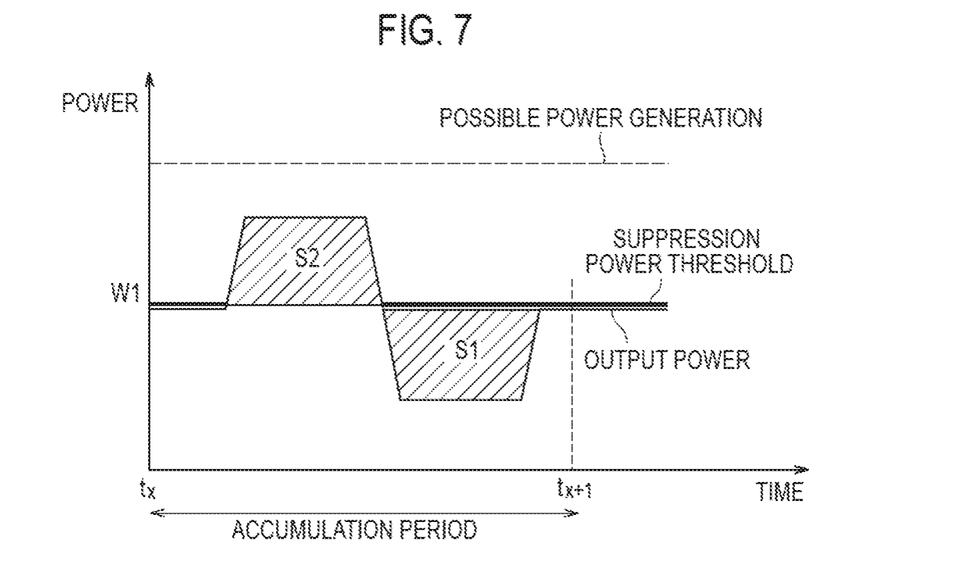
FIG. 7 is a graph for describing a control according to another embodiment.

One example of the control according to another embodiment will be described, below. FIG. 6 and FIG. 7 are diagrams for describing one example of the control according to another embodiment.

Firstly, the suppression power threshold will be described with reference to FIG. 6. FIG. 6 illustrates a case, as an example, where the output suppression message is notified at a time t0 and the output suppression release message is notified at a time t2. The output suppression release message is a message instructing a suppression release of the output of the solar cell 110. Here, the output suppression message is a message instructing suppression of the output of the solar cell 110 to W1 or less.

In such a case, in a period from the time t0 to the time t1, the suppression power threshold decreases gradually at a previously determined decrease rate. The output suppression message is transmitted simultaneously to a plurality of PCSs, and thus, the decrease rate is previously determined to suppress a rapid decrease of an amount of reverse power flow to the power grid 10. On the other hand, after the time t2, the suppression power threshold increases gradually at a previously determined increase rate. The output suppression release message is transmitted simultaneously to a plurality of PCSs, and thus, the increase rate is previously determined to suppress a rapid increase of an amount of reverse power flow to the power grid 10.

Secondly, the control will be described with reference to FIG. 7. In FIG. 7, in the accumulation period from a time $t_x$ to a time $t_{x+1}$, the power is stored in the storage battery 120. The output of the solar cell 110 (possible power generation) exceeds the suppression power threshold over a whole accumulation period, for example.

In such a case, the PCS 130 performs a control of increasing the output of the solar cell 110 to exceed the suppression power threshold. It should be noted however that the accumulated value (area S2) of the output of the solar cell 110 exceeding the suppression power threshold does not exceed the charge amount (area S1) of the storage battery 120.

FIG. 7 illustrates, as an example, a case where the control is performed before the storage battery 120 is charged. Therefore, the charge amount (area S1) of the storage battery 120 is a storage capability of the storage battery 120.

(Control Method)

Figure 8:
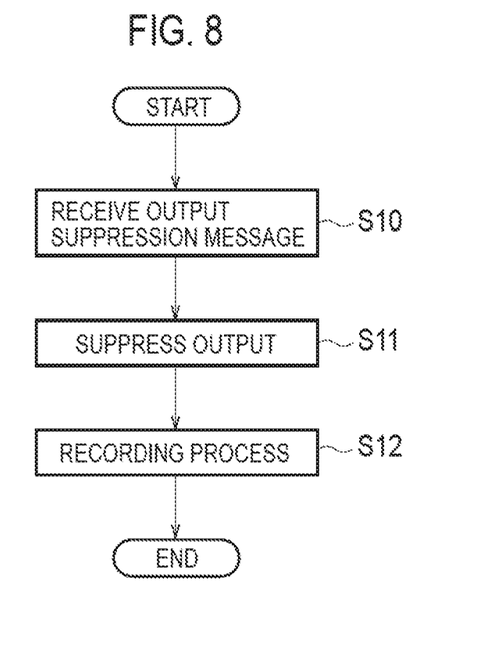
FIG. 8 is a flowchart illustrating a control method according to another embodiment.

A control method according to another embodiment will be described below. FIG. 8 is a flowchart illustrating the control method according to the other embodiment.

As illustrated in FIG. 8, in step S10, the PCS 130 receives an output suppression message.

In step S11, the PCS 130 suppresses the output of the solar cell 110 according to the output suppression message. Here, when there is an insufficient output period in the accumulation period included in the suppression period, the PCS 130 performs a control of increasing the output of the solar cell 110 to exceed the suppression power threshold. The control is described in detail, as above.

In step S12, the PCS 130 accumulates the accumulated value of the output of the PCS 130 (inverter 133) for each accumulation period (30 minutes, for example), and outputs the accumulated value accumulated for each accumulation period as the verification record. The verification record is recorded in the recording apparatus 500.

(Operation and Effect)

In another embodiment, when the storage battery 120 is charged with the output of the solar cell 110 in the accumulation period, the PCS 130 performs a control of increasing the output of the solar cell 110 to exceed the suppression power threshold. Therefore, when the reverse power flow to the power grid is concerned, a situation is prevented where the output of the solar cell 110 is excessively suppressed in spite of the decrease of the output of the PCS 130 due to the charging of the storage battery 120, and thus, it is possible to alleviate the disadvantage to a user.

Another Embodiment

Another embodiment will be described, below. A difference from the above-described embodiment will be described, below.

Figure 9:
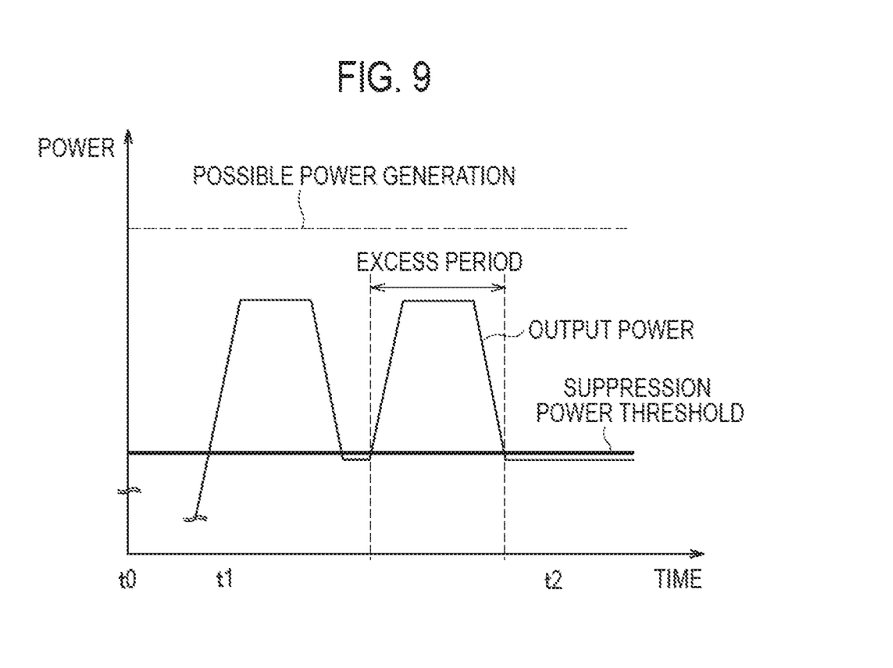
FIG. 9 is a graph for describing a control according to another embodiment.

Firstly, in the other embodiment, in the control, a period (hereinafter, excess period) during which the output of the solar cell 110 continuously exceeds the suppression power threshold is equal to or less than a previously determined period (5 minutes, for example). Specifically, as illustrated in FIG. 9, the PCS 130 (controller 134) performs a correction control of ensuring the excess period not to exceed the previously determined period even when the output of the solar cell 110 (possible power generation) exceeds the suppression power threshold for a long period of time. As a result, an influence such as the reverse power flow to the power grid 10 is alleviated.

Figure 10:
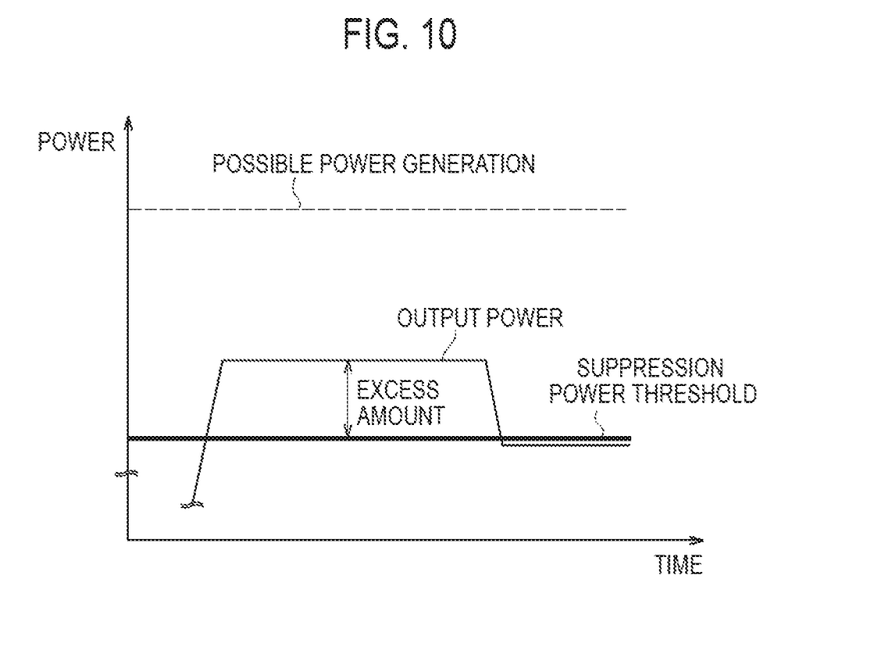
FIG. 10 is a graph for describing a control according to another embodiment.

Secondly, in the control, an amount by which the output of the distributed power source exceeds the suppression power threshold is equal to or less than a previously determined amount (the suppression power threshold+5%, for example). Specifically, as illustrated in FIG. 10, the PCS 130 (controller 134) performs a correction control of ensuring the excess amount not to exceed the previously determined amount even when the output of the solar cell 110 (possible power generation) greatly exceeds the suppression power threshold. As a result, an influence such as the reverse power flow to the power grid 10 is alleviated.

Another Embodiment

Another embodiment will be described, below. A difference from the above-described embodiment will be described, below.

Figure 11:
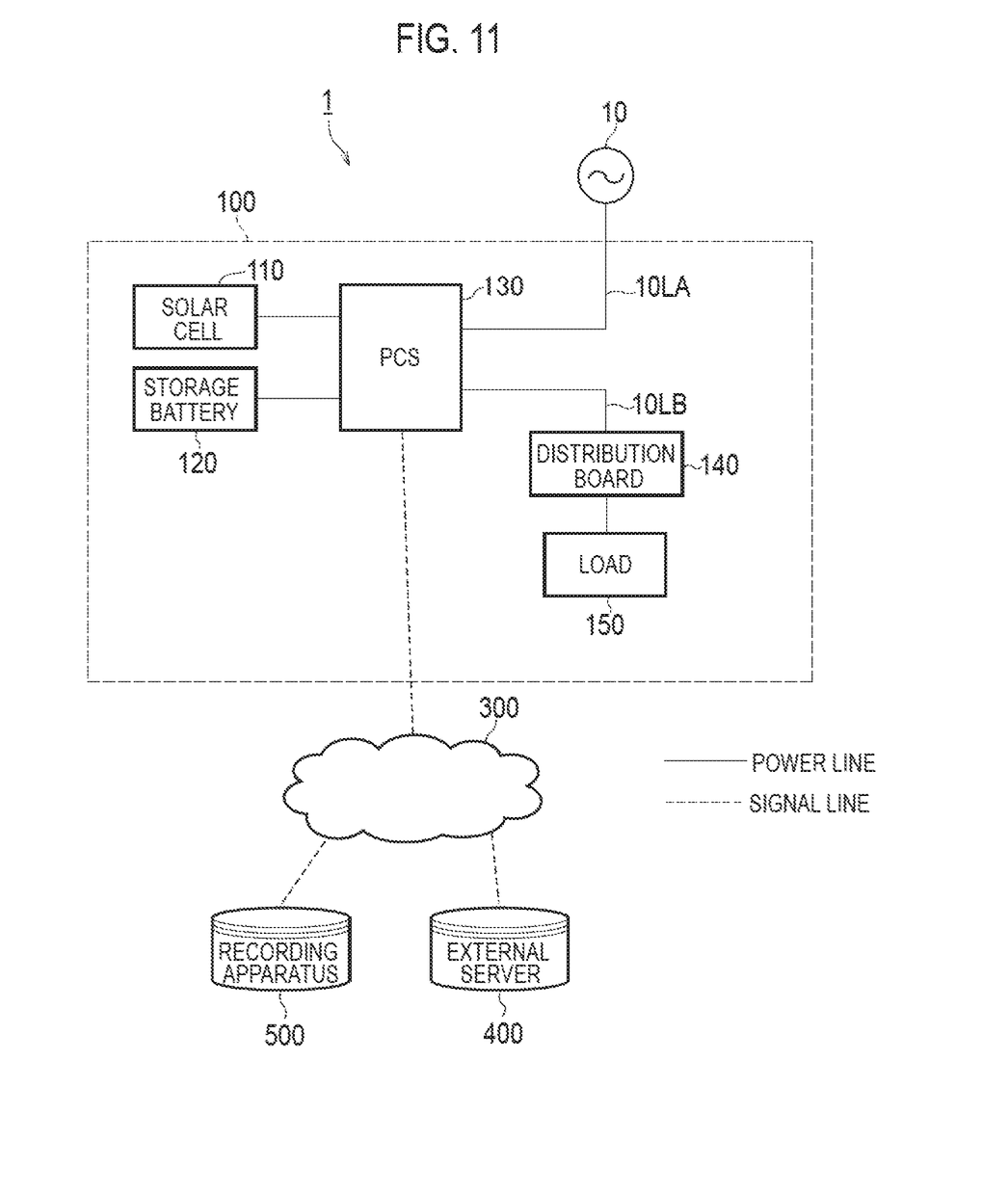
FIG. 11 is a diagram illustrating the power management system 1 according to another embodiment.

In the other embodiment, the consumer's facility 100 does not have the EMS 200 and the remote controller 210, as illustrated in FIG. 11. The PCS 130 (communication unit 135) is directly connected to the network 300, and communicates with the external server 400 and the recording apparatus 500. Therefore, the PCS 130 (communication unit 135) transmits the verification record output from the controller 134 to the recording apparatus 500 while skipping the remote controller 210 and the EMS 200.

Another Embodiment

Another embodiment will be described, below. A difference from the above-described embodiment will be described, below.

Figure 12:
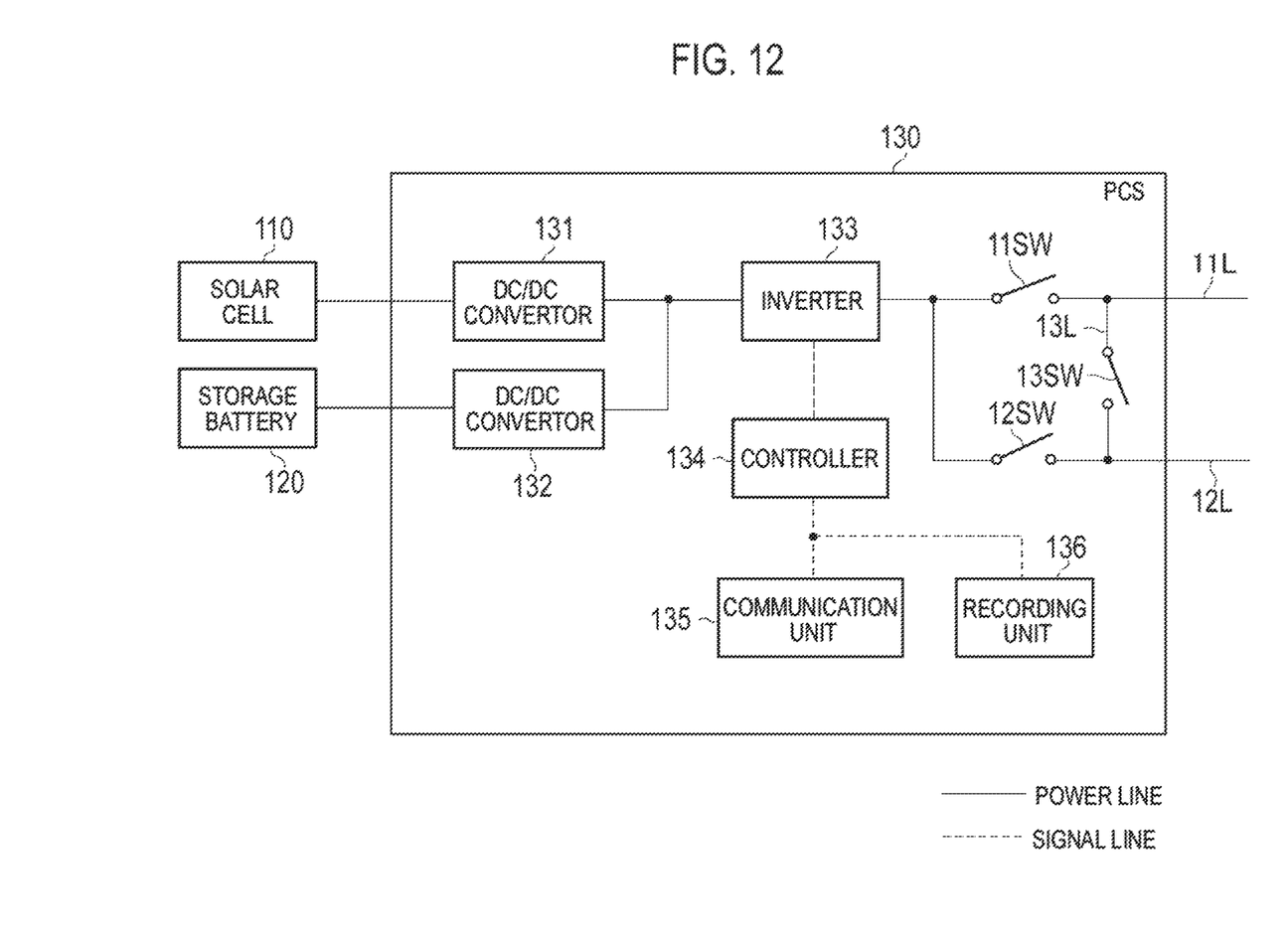
FIG. 12 is a diagram illustrating the PCS 130 according to another embodiment.

In the other embodiment, the PCS 130 includes a recording unit 136, as illustrated in FIG. 12. The recording unit 136 records, in much the same way as the recording apparatus 500 does, the verification record to verify whether or not the suppression of the output of the distributed power source is correctly executed according to the output suppression message. It should be noted that in such a case, the recording unit 136 records the verification record output from the controller 134.

In the other embodiment, the recording unit 136 that records the verification record is provided in the PCS 130, and thus, the power management system 1 need not to include the recording apparatus 500.

Other Embodiments

The present invention was described in terms of the embodiment set forth above, the invention should not be understood to be limited by the statements and the drawings constituting a part of this disclosure. From this disclosure, various alternative embodiments, examples, and operational technologies will be obvious to those skilled in the art.

The embodiments provide an example of the PCS 130 connected to the solar cell 110 and the storage battery 120; however, this is not limiting. It is possible that the PCS 130 is not connected to the storage battery 120 but connected only to the solar cell 110.

The embodiments provide an example of the solar cell 110 as the distributed power source to operate in accordance with the output suppression message. However, the distributed power source is not limited thereto. The distributed power source may be an equipment that utilizes a natural energy such as a wind power and a geothermal heat to generate power. Alternatively, the distributed power source may be a fuel cell that utilizes a fuel gas to produce power.

In the embodiments, the controller 134 controls the PCS 130. In such a case, the controller 134 may control the PCS 130 according to an instruction from the EMS 200 or the remote controller 210. That is, a controller (functional block including a similar function to the controller 134) that suppresses the output of the distributed power source to equal to or less than the suppression power threshold determined by the output suppression message may be provided in the EMS 200 or the remote controller 210.

In the other embodiment, the recording unit 136 that records the verification record is provided in the PCS 130. However, the embodiment is not limited thereto. The recording unit 136 that records the verification record may be provided in the EMS 200 or the remote controller 210.

The entire contents of PCT Application No. PCT/JP2016/055569 (filed on Feb. 25, 2016), which claims priority to and the benefit of Japanese patent application No. 2015-035086 (filed on Feb. 25, 2015) and Japanese patent application No. 2015-035911 (filed on Feb. 25, 2015) are incorporated herein by reference.

The invention claimed is:

1. A power converting apparatus comprising:
    an inverter that converts a DC (Direct Current) power input from a distributed power source to an AC (Alternating Current) power; and
    a controller that suppresses a DC output of the distributed power source to equal to or lower than a suppression power threshold indicating a suppression degree for the DC output of the distributed power source;
    wherein
    the suppression takes place between the distributed power source and the inverter,
    the controller performs a control of increasing the DC output of the distributed power source to exceed the suppression power threshold, when there is a period, where the DC output of the distributed power source falls below the suppression power threshold, in an accumulation period, and
    the accumulation period is included in a suppression period for suppressing the DC output of the distributed power source.

2. The power converting apparatus according to claim 1, wherein the controller performs, in the accumulation period, the control so that an accumulated value of the DC output of the distributed power source does not exceed an accumulated value of the suppression power threshold.

3. The power converting apparatus according to claim 1, wherein the controller performs, in the accumulation period, the control so that an average value of the DC output of the distributed power source does not exceed an average value of the suppression power threshold.

4. The power converting apparatus according to claim 1, wherein the controller controls the DC output of the distributed power source so as to approach a target power, and the controller sets, in the suppression period, the suppression power threshold to the target power and sets, outside the suppression period, a maximum power to the target power.

5. The power converting apparatus according to claim 1, wherein, in the control, a period during which the DC output of the distributed power source continuously exceeds the suppression power threshold is equal to or shorter than a previously determined period.

6. The power converting apparatus according to claim 1, wherein, in the control, an amount by which the DC output of the distributed power source exceeds the suppression power threshold is equal to or less than a previously determined amount.

7. The power converting apparatus according to claim 1, wherein the controller outputs an accumulated value of the DC output of the distributed power source in the accumulation period.

8. A power management system comprising:
    a power converting apparatus that converts a DC (Direct Current) power input from a distributed power source to an AC (Alternating Current) power; and
    a controller that suppresses a DC output of the distributed power source equal to or lower than a suppression power threshold indicating a suppression degree for the DC output of the distributed power source;
    wherein
    the suppression takes place between the distributed power source and the inverter,
    the controller performs a control of increasing the DC output of the distributed power source to exceed the suppression power threshold, when there is a period, where the DC output of the distributed power source falls below the suppression power threshold, in an accumulation period, and the accumulation period is included in a suppression period in which the DC output of the distributed power source is suppressed.

9. A power converting apparatus comprising:
an inverter that converts a DC (Direct Current) power input from a distributed power source to an AC (Alternating Current) power, converts a DC power input from a storage battery to an AC power, and converts a AC power to a DC power output to the storage battery; and
a controller that suppresses a DC output of the distributed power source equal to or lower than a suppression power threshold indicating a suppression degree for the DC output of the distributed power source;
wherein
the suppression takes place between the distributed power source and the inverter,
the controller performs a control of increasing the DC output of the distributed power source to exceed the suppression power threshold, in an accumulation period, when the storage battery is charged with the DC output of the distributed power source, and
the accumulation period is included in a suppression period in which the DC output of the distributed power source is suppressed.

10. The power converting apparatus according to claim 9, wherein the controller performs, in the accumulation period, the control so that an accumulated value of an excess amount by which the DC output of the distributed power source exceeds the suppression power threshold does not exceeds a charge amount of the storage battery.

11. The power converting apparatus according to claim 9, wherein the controller performs the control on the basis of a storage capability of the storage battery when performing the control before the storage battery is charged.

12. The power converting apparatus according to claim 9, wherein the controller performs the control on the basis of a currently stored amount of the storage battery when performing the control after the storage battery is charged.

13. The power converting apparatus according to claim 9, wherein the controller controls the DC output of the distributed power source so as to approach a target power, and the controller sets, in the suppression period, the suppression power threshold to the target power and sets, outside the suppression period, a maximum power to the target power.

14. The power converting apparatus according to claim 9, wherein, in the control, a period during which the DC output of the distributed power source continuously exceeds the suppression power threshold is equal to or shorter than a previously determined period.

15. The power converting apparatus according to claim 9, wherein, in the control, an amount by which the DC output of the distributed power source exceeds the suppression power threshold is equal to or less than a previously determined amount.

16. The power converting apparatus according to claim 9, wherein the controller outputs an accumulated value of the output of the inverter in the accumulation period.

17. A power management system comprising:
a power converting apparatus that converts a DC (Direct Current) power input from a distributed power source to an AC (Alternating Current) power, converts a DC power input from a storage battery to an AC power, and converts a AC power to a DC power output to the storage battery; and
a controller that suppresses a DC output of the distributed power source equal to or lower than a suppression power threshold indicating a suppression degree for the DC output of the distributed power source;
wherein
the suppression takes place between the distributed power source and the inverter,
the controller performs a control of increasing the DC output of the distributed power source to exceed the suppression power threshold, in an accumulation period, when the storage battery is charged with the DC output of the distributed power source, and
the accumulation period is included in a suppression period in which the DC output of the distributed power source is suppressed.

18. A power converting method, comprising the steps of:
converting a DC (Direct Current) power input from a distributed power source to an AC (Alternating Current) power, converting a DC power input from a storage battery to an AC power, and converting a AC power to a DC power output to the storage battery;
suppressing a DC output of the distributed power source to equal to or lower than a suppression power threshold indicating a suppression degree for the DC output of the distributed power source, wherein the suppression takes place before conversion of the DC power input from the distributed power source to the AC power; and
performing a control of increasing the DC output of the distributed power source so that the DC output of the distributed power source exceeds the suppression power threshold, in an accumulation period, when the storage battery is charged with the DC output of the distributed power source, wherein the accumulation period is included in a suppression period in which the DC output of the distributed power source is suppressed.

* * * * *